United States Patent
Ashida

(10) Patent No.: US 11,121,658 B2
(45) Date of Patent: Sep. 14, 2021

(54) MOTOR CONTROL APPARATUS, IMAGE FORMING APPARATUS, AND CONTROL METHOD OF MOTOR CONTROL APPARATUS

(71) Applicant: CANON KABUSHIKI KAISHA, Tokyo (JP)

(72) Inventor: Jumpei Ashida, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 191 days.

(21) Appl. No.: 16/199,621

(22) Filed: Nov. 26, 2018

(65) Prior Publication Data
US 2019/0165711 A1    May 30, 2019

(30) Foreign Application Priority Data
Nov. 27, 2017  (JP) .............................. JP2017-227046

(51) Int. Cl.
| | |
|---|---|
| H02P 21/14 | (2016.01) |
| H02P 21/26 | (2016.01) |
| H02P 6/12 | (2006.01) |
| H02P 6/28 | (2016.01) |
| H02P 25/089 | (2016.01) |

(52) U.S. Cl.
CPC ............... *H02P 21/14* (2013.01); *H02P 6/28* (2016.02); *H02P 21/26* (2016.02); *H02P 6/12* (2013.01); *H02P 25/089* (2016.02)

(58) Field of Classification Search
USPC ........................................................ 318/806
See application file for complete search history.

(56) References Cited

U.S. PATENT DOCUMENTS

| | | | |
|---|---|---|---|
| 7,002,318 B1 * | 2/2006 | Schulz | B60L 3/0038 318/437 |
| 9,660,561 B2 * | 5/2017 | Yamada | B60L 3/0084 |
| 2007/0236167 A1 * | 10/2007 | Tomigashi | H02P 6/18 318/721 |
| 2019/0039645 A1 * | 2/2019 | Kuwahara | B62D 15/021 |
| 2020/0300671 A1 * | 9/2020 | Mori | G01R 35/00 |

FOREIGN PATENT DOCUMENTS

| | | |
|---|---|---|
| JP | 2008220169 A | 9/2008 |
| JP | 2015213398 A | 11/2015 |

* cited by examiner

*Primary Examiner* — Jorge L Carrasquillo
(74) *Attorney, Agent, or Firm* — Carter, DeLuca & Farrell LLP

(57) ABSTRACT

A parameter concerning rotation of a motor is estimated (first estimation). A parameter concerning rotation of the motor is estimated, based on a model representing a prescribed change in a rotation speed of the motor (second estimation). It is determined whether an anomaly has occurred in the rotation of the motor, based on the parameter estimated in the first estimation and the parameter estimated in the second estimation.

20 Claims, 8 Drawing Sheets

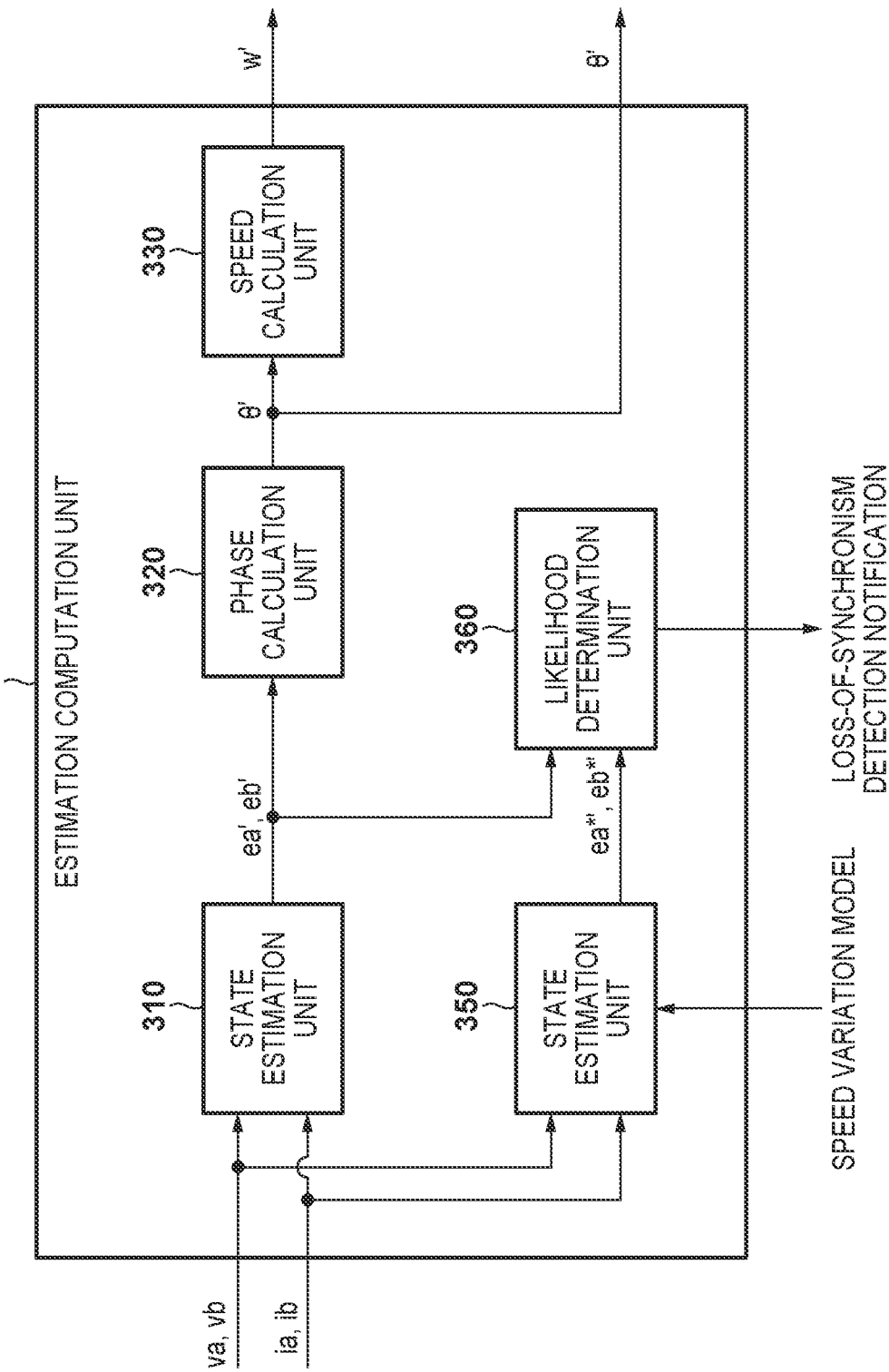
F I G. 3

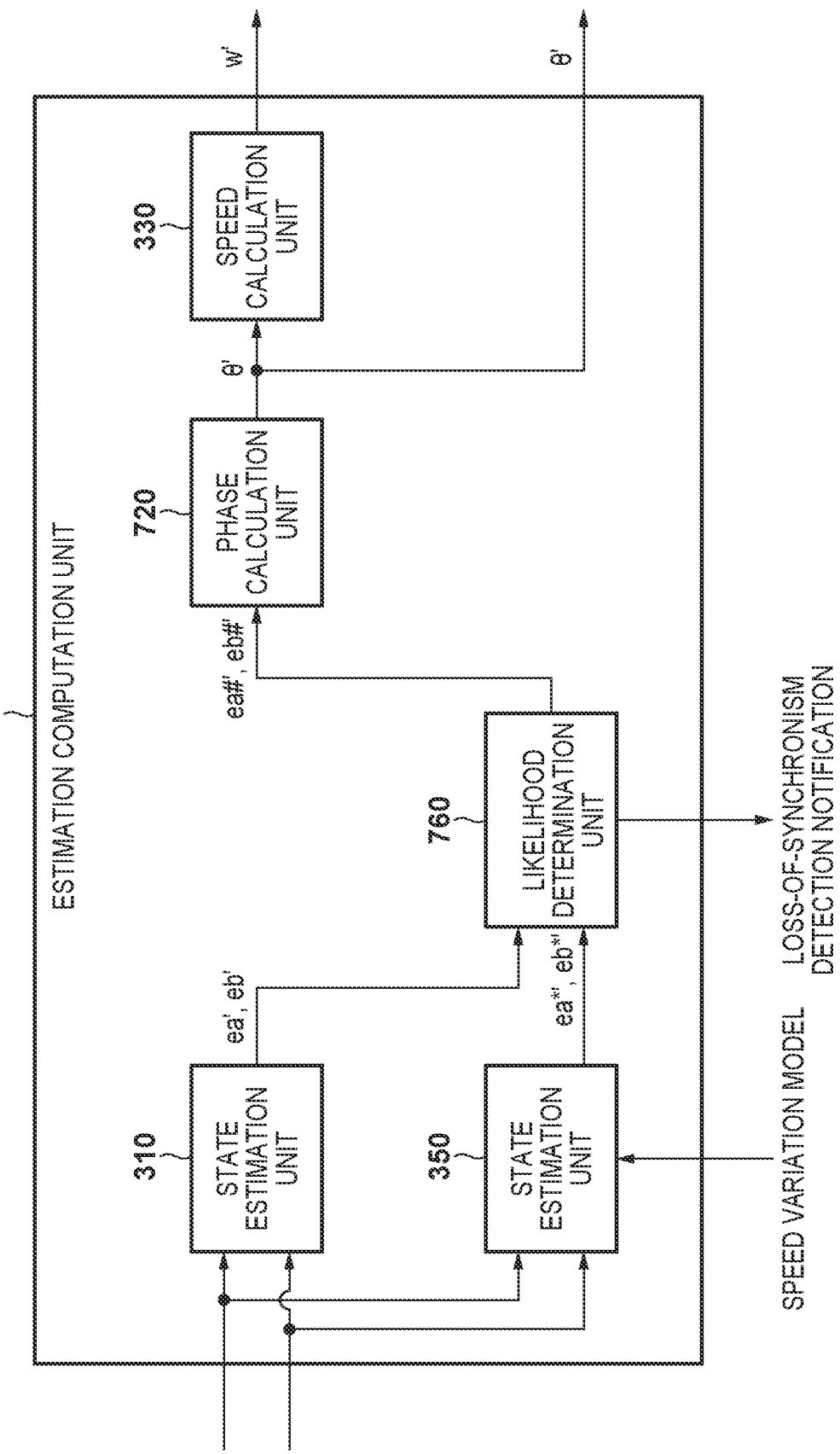
F I G. 7

MOTOR CONTROL APPARATUS, IMAGE FORMING APPARATUS, AND CONTROL METHOD OF MOTOR CONTROL APPARATUS

BACKGROUND OF THE INVENTION

Field of the Invention

The present invention relates to a motor control technology.

Description of the Related Art

With laser beam printers, a brushless DC motor or the like is used for driving components such as the photoconductive drums and transfer belt. Generally, brushless DC motors have three-phase stators for a U-phase, a V-phase and a W-phase, and the motor is rotated by controlling the voltage that is applied to these stators. At this time, a stable rotation speed is realized by detecting the rotation speed which changes according to the load and the like, and feeding the detected rotation speed back into control. Conventionally, the rotation speed is measured using a Hall sensor or the like, although, in recent years, a system (sensorless vector control) that estimates the rotation speed from three-phase current values without using a sensor has become widely used (e.g., Japanese Patent Laid-Open No. 2015-213398).

With a laser beam printer, the load on the motor may suddenly change due to factors such as paper jams and foreign matter getting into the printer, possibly resulting in the motor losing synchronism. Since issues such as paper damage and excessive current flow occur when loss of synchronism arises, loss of synchronism is desirably detected as early as possible.

When using a sensor as is conventionally the case, it is possible to detect loss of synchronism directly. However, in the case of sensorless vector control, while there is no problem as long as the rotation speed can be correctly estimated even during loss of synchronism, it is difficult to accurately estimate sudden changes in speed with a normal estimator, particularly under circumstances where the noise component that is included in the current value is comparatively large.

In response to such issues, in Japanese Patent Laid-Open No. 2008-220169, a second estimator obtained by approximating an equation is used in addition to a normal estimator (first estimator) to detect loss of synchronism by comparing a speed estimation value which is the output of the second estimator with a speed command value.

However, with the technique recited in Japanese Patent Laid-Open No. 2008-220169, since the second estimator is an approximation of the first estimator, a similar estimation result to the first estimator will possibly be obtained even when the second estimator is used, and the judgment result may not be all that different from judging loss of synchronism based on the result of the first estimator. Thus, it is difficult to stably judge loss of synchronism.

SUMMARY OF THE INVENTION

The present invention has been made in consideration of such problems, and realizes a technology for detecting an anomaly concerning rotation of a motor with high accuracy and speed, in a configuration for estimating a motor rotation speed without using a sensor.

According to one aspect of the present invention, there is provided a motor control apparatus comprising: a first estimation unit configured to estimate a parameter concerning rotation of a motor; a second estimation unit configured to estimate a parameter concerning rotation of the motor, based on a model representing a prescribed change in a rotation speed of the motor; and a determination unit configured to determine whether an anomaly has occurred in the rotation of the motor, based on the parameter estimated by the first estimation unit and the parameter estimated by the second estimation unit.

According to another aspect of the present invention, there is provided an image forming apparatus comprising: a motor control apparatus including: a first estimation unit configured to estimate a parameter concerning rotation of a motor; a second estimation unit configured to estimate a parameter concerning rotation of the motor, based on a model representing a prescribed change in a rotation speed of the motor; and a determination unit configured to determine whether an anomaly has occurred in the rotation of the motor, based on the parameter estimated by the first estimation unit and the parameter estimated by the second estimation unit; and the motor.

According to still another aspect of the present invention, there is provided a control method of a motor control apparatus, comprising: performing a first estimation for estimating a parameter concerning rotation of a motor; performing a second estimation for estimating a parameter concerning rotation of the motor, based on a model representing a prescribed change in a rotation speed of the motor; and determining whether an anomaly has occurred in the rotation of the motor, based on the parameter estimated in the first estimation and the parameter estimated in the second estimation.

Further features of the present invention will become apparent from the following description of exemplary embodiments (with reference to the attached drawings).

BRIEF DESCRIPTION OF THE DRAWINGS

FIG. 3 is a block diagram showing an exemplary functional configuration of an estimation computation unit 240.

FIG. 7 is a block diagram showing an exemplary functional configuration of the estimation computation unit 240.

DESCRIPTION OF THE EMBODIMENTS

Hereinafter, embodiments of the present invention will be described with reference to the accompanying drawings. Note that the embodiments described below illustrate examples of cases where the present invention is implemented in a specific manner, and are specific examples of configurations recited in the claims.

First Embodiment

Figure 1:
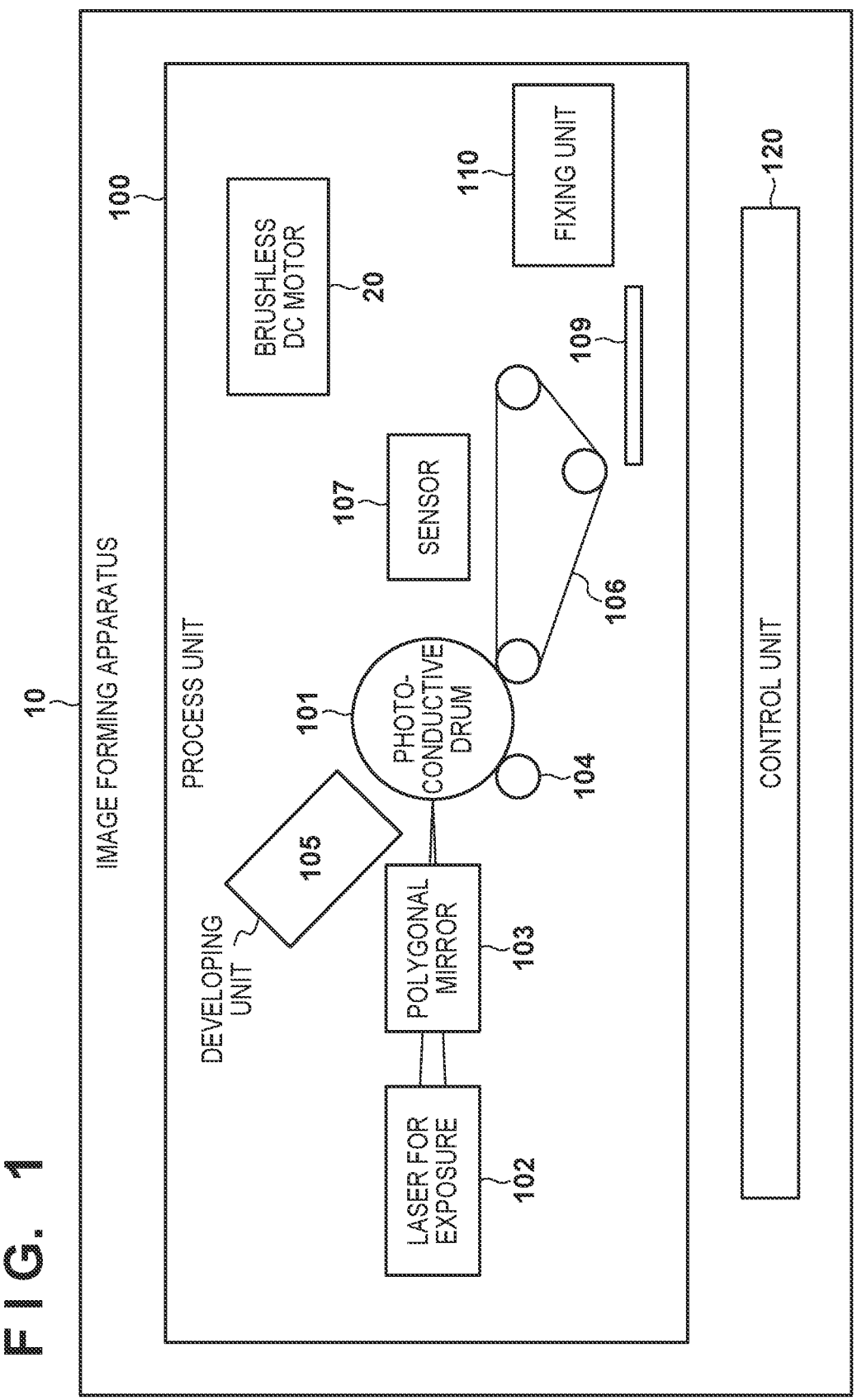
FIG. 1 is a block diagram showing an exemplary hardware configuration of an image forming apparatus.

First, an exemplary hardware configuration of an electrophotographic image forming apparatus according to the present embodiment will be described using the block diagram of FIG. 1. As shown in FIG. 1, an image forming apparatus 10 according to the present embodiment has a process unit 100 and a control unit 120. Note that FIG. 1 shows the main configuration related to the following description, and illustration of elements that are not particularly touched upon in the following description (e.g., functional units concerning power supply) is omitted. In other words, the entire configuration of the image forming apparatus is not illustrated in FIG. 1. Also, the configuration shown in FIG. 1 is merely an example of a configuration capable of realizing the operations described below, and modifications/changes can be made to that configuration as appropriate.

First, the process unit 100 will be described. A charging roller 104 charges the surface of a photoconductive drum 101. A laser 102 for exposure irradiates a light beam such as laser light, and the photoconductive drum 101 serving as an image carrier is irradiated with this light beam via a polygon mirror 103, and an electrostatic latent image is thereby formed on the photoconductive drum 101. The electrostatic latent image formed on the photoconductive drum 101 by the light beam is developed (a toner image formed) using toner by a developing unit 105, and, after being temporarily transferred to a transfer belt 106, this toner image is transferred to a conveyed printing sheet (sheet) 109. The process unit 100 is able to form a full color image, by sequentially executing this series of image forming processes for each of yellow (Y), magenta (M), cyan (C), and black (K) toner. Also, a configuration may be adopted that enables toner of so-called special colors, clear toner and the like to be transferred, in addition to the four colors. The printing sheet 109 on which the full color image has been formed is conveyed to a fixing unit 110. The fixing unit 110 is constituted by a combination of rollers and a belt, has a built-in heat source such as a halogen heater, and uses heat and pressure to melt and fix the toner on the printing sheet 109 to which the toner image has been transferred. A sensor 107 captures the toner image on the transfer belt 106, and is used in processing such as calibration of the toner amount and color shift (in the case of a color machine).

The control unit 120 performs operational control of the process unit 100 (control of various image forming processes such as charging, exposure, development, transfer and fixing), and also performs overall control of the image forming apparatus 10. The control unit 120 has one or more processors and a memory holding data and computer programs that are executed by the one or more processors. The control unit 120, as a result of these one or more processors executing processing using the computer programs and data that are stored in the memory, executes respective processing which will be described later as processing that is executed by the control unit 120.

Here, rotation of the photoconductive drum 101 and conveyance of the transfer belt 106 are performed by a brushless DC motor (M) 20, and operational control (rotational control) of the brushless DC motor 20 is performed by the control unit 120. The brushless DC motor 20 is a motor that normally rotates at a desired rotation speed, by controlling the voltage that is applied to the three-phase stators. In the present embodiment, as an example, three-phase current values are acquired, and the brushless DC motor 20 is controlled by sensorless vector control using these current values.

Figure 2:
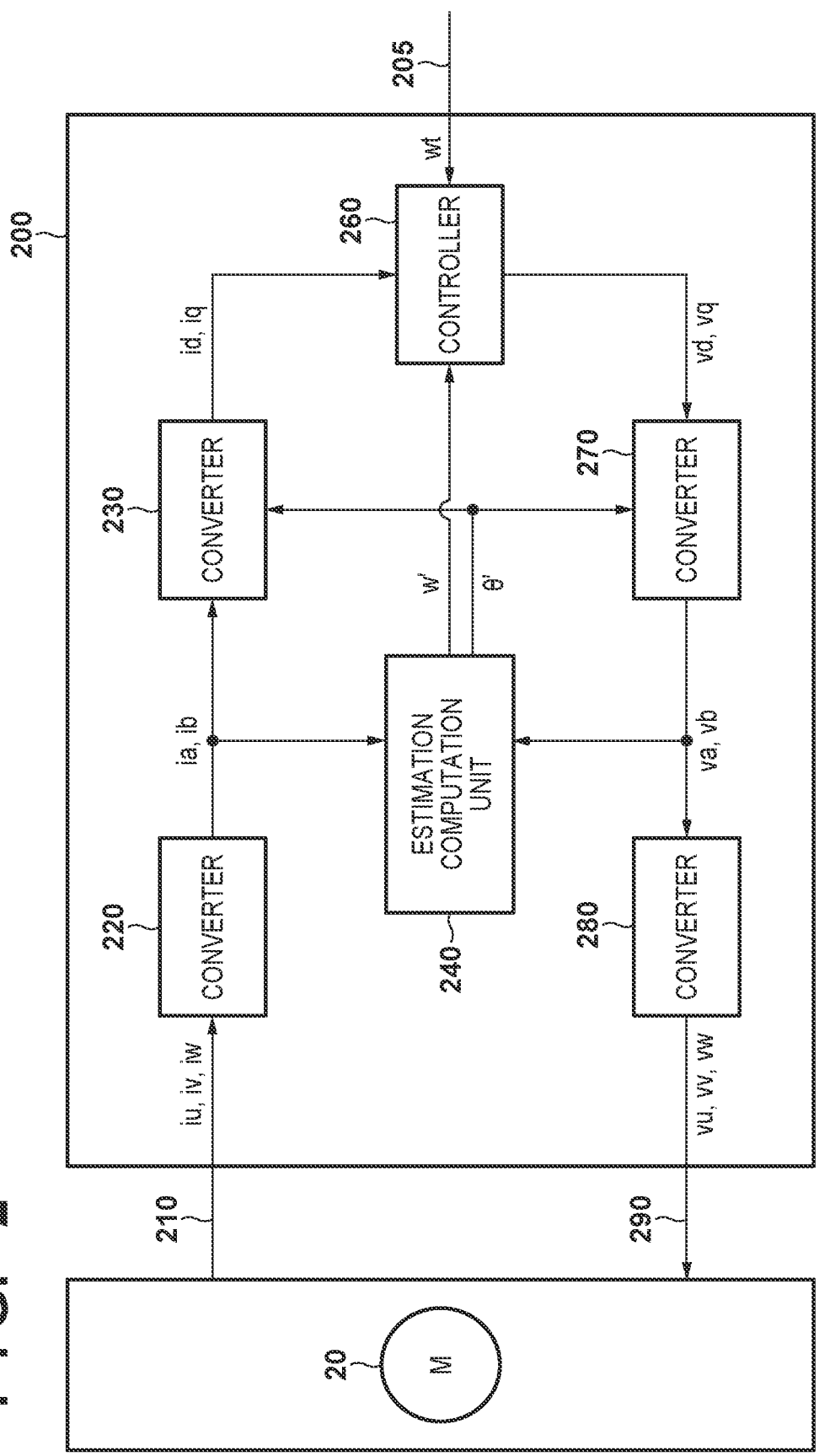
FIG. 2 is a block diagram showing an exemplary functional configuration of a motor control unit 200.

Next, an exemplary functional configuration of a motor control unit 200 that is provided in the control unit 120 will be described using the block diagram of FIG. 2. As shown in FIG. 2, the motor control unit 200 acquires a speed command value (command speed) wt that is input via an input port 205, and a U-phase current value iu, a V-phase current value iv and a W-phase current value iw that are input via an input port 210. The motor control unit 200 then derives a U-phase current operation amount vu, a V-phase current operation amount vv and a W-phase current operation amount vw for driving the brushless DC motor 20, based on the speed command value wt, the U-phase current value iu, the V-phase current value iv, and the W-phase current value iw. The motor control unit 200 then outputs the derived U-phase current operation amount vu, V-phase current operation amount vv and W-phase current operation amount vw to the brushless DC motor 20 via an output port 290. Note that if the process unit 100 has a controller that performs drive control of the brushless DC motor 20, this controller may be configured as the output destination of the U-phase current operation amount vu, the V-phase current operation amount vv, and the W-phase current operation amount vw. Here, "current operation amount" means a voltage command value indicating the voltage to be applied. The motor control unit 200 realizes rotation of the stable brushless DC motor 20 by repeating such operations in a regular cycle (e.g., 50 μs).

Each functional unit of the motor control unit 200 shown in FIG. 2 may be implemented by hardware, or may be implemented by software (computer program). In the case of the former, the motor control unit 200 may be realized with a FPGA or a custom LSI, or may be realized by combining two or more out of a processor, a FPGA and a custom LSI. In the case of the latter, this computer program is stored in a memory of the control unit 120, and the functions of the corresponding functional units are realized as a result of the one or more processors of the control unit 120 executing this computer program.

A converter 220 derives an α-axis current value ia and a β-axis current value ib, by performing coordinate conversion processing on the U-phase current value iu, the V-phase current value iv and the W-phase current value iw input via the input port 210. Here, the α-β axes represent a static coordinate system. For example, the α-axis can be set to one of the phase directions, such as the U-phase direction, for example, and the β-axis can be set to a direction that is orthogonal to the α-axis. Note that a configuration may be adopted in which ia and ib are derived from suitable two-phase current values among iu, iv and iw.

A converter 230 derives a d-axis current value id and a q-axis current value iq, by performing coordinate rotation processing that is based on an estimated phase θ' from an estimation computation unit 240 on the α-axis current is and the β-axis current value ib. Here, the d-q axes represent a rotating coordinate system. For example, the d-axis can be set to a predetermined direction of a rotor, such as the north direction, for example, and the q-axis can be set to a direction that is orthogonal to the d-axis.

A controller 260 determines a q-axis current command value for adjusting the rotation speed of the brushless DC motor 20, from the speed command value wt that is input via the input port 205, and an estimated speed w' of the brushless DC motor 20 that is output by the estimation computation unit 240. The controller 260 then derives a d-axis current operation amount vd, and a q-axis current operation amount vq from the q-axis current command value, the d-axis current value id and the q-axis current value iq, and outputs the derived d-axis current operation amount vd and q-axis current operation amount vq to a converter 270. Also, the controller 260, in the case where a loss-of-synchronism detection notification is received from the estimation computation unit 240, performs control directed at a safety stop on the brushless DC motor 20, such as gradually reducing the d-axis current operation amount vd and the q-axis current operation amount vq over time.

The converter 270 derives an α-axis current operation amount va and a β-axis current operation amount vb, by performing coordinate rotation processing that is based on the estimated phase θ' from the estimation computation unit 240 on the d-axis current operation amount vd and the q-axis current operation amount vq.

The converter 280 derives the U-phase current operation amount vu, the V-phase current operation amount vv and the W-phase current operation amount vw, by performing coordinate conversion processing on the α-axis current operation amount va and the β-axis current operation amount vb. The converter 280 then outputs the U-phase current operation amount vu, the V-phase current operation amount vv and the W-phase current operation amount vw to the brushless DC motor 20 via the output port 290. As described above, if the process unit 100 has a controller that performs drive control of the brushless DC motor 20, this controller may be configured as the output destination of the U-phase current operation amount vu, the V-phase current operation amount vv and the W-phase current operation amount vw.

The estimation computing device 240 derives the estimated speed w' and the estimated phase θ' of the brushless DC motor 20 from the α-axis current operation amount va, the β-axis current operation amount vb, the α-axis current value ia and the β-axis current value ib. The estimation computation unit 240 outputs the derived estimated speed w' to the controller 260, and outputs the derived estimated phase θ' to the converter 230 and the converter 270. Specifically, the estimation computing device 240 estimates an induced voltage that occurs in the brushless DC motor 20 as "a state value of the brushless DC motor 20" (estimation target), and calculates the estimated speed w' and the estimated phase θ' from the induced voltage that is estimated. Also, the estimation computation unit 240 performs processing for detecting whether loss of synchronism has occurred in the brushless DC motor 20, and, if the occurrence of loss of synchronism is detected, outputs the loss-of-synchronism detection notification to the controller 260.

Next, an exemplary functional configuration of the estimation computation unit 240 will be described using the block diagram of FIG. 3. A state estimation unit 310 estimates induced voltages ea' and eb' that occur in the brushless DC motor 20, using the current operation amounts va and vb and the current values ia and ib. In the estimation, a circuit equation of the motor model shown by the following equation (1) and a state equation of the induced voltages shown by the following equation (2) can be used, for example.

$$V = R \cdot I + L \cdot \frac{d}{dt} I + E \quad (1)$$

$$\frac{d}{dt} E = J \cdot E \quad (2)$$

Here, $V = \begin{bmatrix} va \\ vb \end{bmatrix}, I = \begin{bmatrix} ia \\ ib \end{bmatrix}, E = \begin{bmatrix} ea \\ eb \end{bmatrix}, J = \begin{bmatrix} 0 & -w \\ w & 0 \end{bmatrix}$.

R and L are respectively the resistance value and the inductance value of the brushless DC motor 20. By constituting an observer with these values, an induced voltage E'=[ea' eb']$^T$ (where T is transposed) can be computed by the following equation (3), for example.

$$E'(t+T) = E'(t) + \left\{ L\left(V - R \cdot I - L \cdot \frac{d}{dt} I - E'(t)\right) + J \cdot E'(t) \right\} \cdot T \quad (3)$$

Here, T is a control cycle and L is an observer gain. In the above equation (3), the previous induced voltage E'(t) is used to derive the induced voltage E'(t+T) in the next control cycle. In this way, the state estimation unit 310 estimates induced voltages ea' and eb', by performing computational processing in accordance with the above equations (1) to (3), using the current operation amounts va and vb and the current values is and ib.

A phase calculation unit 320 derives the estimated phase θ', by performing computational processing in accordance with the following equation (4) using the induced voltages ea' and eb', and outputs the derived estimation phase θ' to a downstream speed calculation unit 330 and to the converter 230 and the converter 270.

$$\theta' = \arctan\left(-\frac{ea'}{eb'}\right) \quad (4)$$

The speed calculation unit 330 derives the estimated speed w', by differentiating the estimated phase θ' derived by the phase calculation unit 320, as shown in the following equation (5), and outputs the derived estimated speed w' to the controller 260.

$$w' = \frac{d}{dt} \theta' \quad (5)$$

Note that, here, the estimated phase θ' is derived first, and then the estimated speed w' is derived by differentiating this estimated phase θ', but a configuration may be adopted in which the estimated speed w' is derived first, and then the estimated phase θ' is derived by integrating the estimated speed w'. Note that a configuration can be adopted in which a filter or the like is added between the functional units in the estimation computation unit 240 (e.g., downstream of the phase calculation unit 320, etc.), and the noise component is removed.

A state estimation unit 350 estimates induced voltages ea*' and eb*' postulated on a loss of synchronism occurring in the brushless DC motor 20, from the current operation amounts va and vb and the current values is and ib. Specifically, the state estimation unit 350 estimates the induced voltages ea*' and eb*' that occur in the brushless DC motor 20, based on a model representing a prescribed change in the rotation speed of the brushless DC motor 20 (model representing a change in the rotation speed corresponding to loss of synchronism of the brushless DC motor 20). In other words, the state estimation unit 350 estimates the induced voltages ea*' and eb*' that occur in the brushless DC motor 20, under the condition that the change in the rotation speed of the brushless DC motor 20 is a prescribed change. Hereinafter, this "model representing a prescribed change in the rotation speed of the brushless DC motor 20 (model representing a change in the rotation speed corresponding to loss of synchronism of the brushless DC motor 20)" will be called a speed variation model. The speed variation model is time series data on the rotation speed representing the prescribed change or a function representing the prescribed change.

Figure 4:
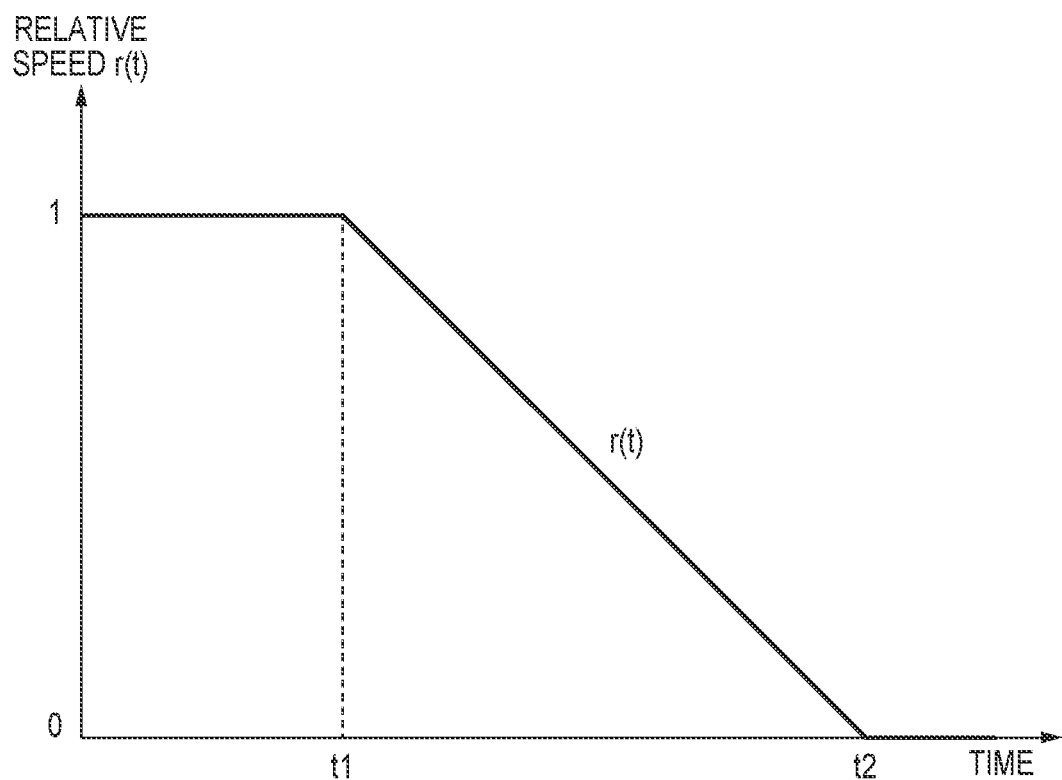
FIG. 4 is a diagram showing an example of a speed variation model.

Here, an example of the speed variation model will be described using FIG. 4. In FIG. 4, the horizontal axis is the axis of time t, and the vertical axis is the axis of a ratio (relative speed) r(t) of the rotation speed of the brushless DC motor 20 to a target speed. The speed variation model of FIG. 4 is a deceleration model (corresponding to loss of synchronism) in which the rotation speed of the brushless DC motor 20 starts decelerating from time t1 and stops at time t2. With an image forming apparatus, a typical cause of loss of synchronism such as a paper jam can be assumed, and thus the variation in rotation speed when a paper jam occurs can be measured in advance (at the time of development, shipping, maintenance, etc.), and the result of this measurement can be acquired as the speed variation model. Note that, in FIG. 4, time t1 and time t2 may also be taken as the elapsed time from starting up of the brushless DC motor 20, or may be taken as the elapsed time after receiving a notification from outside (e.g., notification that sheet conveyance has started). The speed variation model may also be table data (time series data) in which the relative speed r(t) corresponding to each time t is registered, or may be a parameter (t1, t2, acceleration, etc.) prescribing the relative speed r(t).

Figure 5:
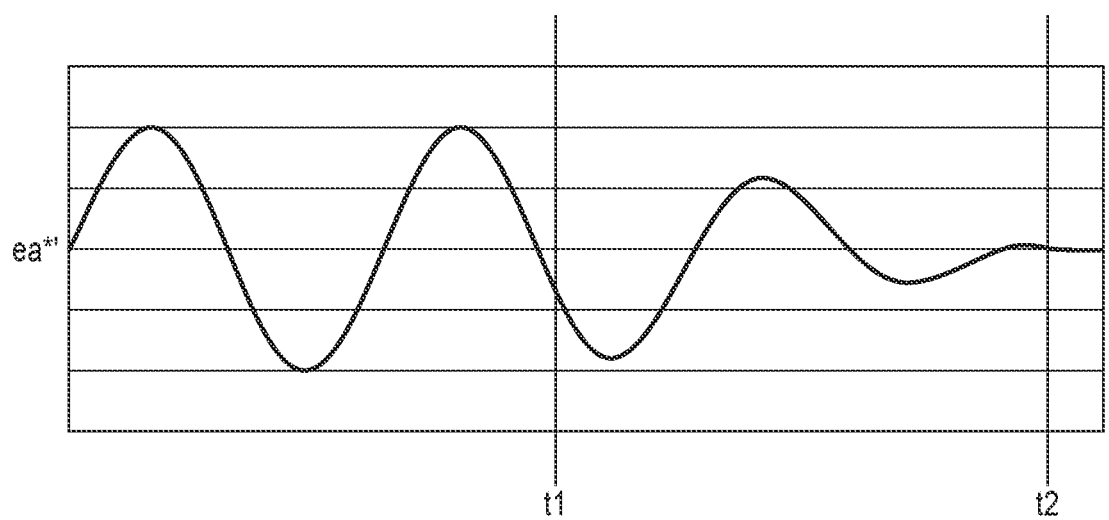
FIG. 5 is a diagram illustrating estimation of induced voltage.

Normally, the induced voltage is proportional to the rotation speed, and thus the state estimation unit 350 estimates the induced voltage such that the absolute value of ea*' (eb*') gradually decreases as shown in FIG. 5, for example, in correspondence with the relative speed r(t) of FIG. 4. As shown in FIG. 5, the induced voltage is substantially a sine wave until time t1, but decreases in amplitude from time t1 to time t2, and converges to 0 after time t2. Note that the amplitude for only one axis (ea*') is shown in FIG. 5, but the amplitude for the other axis (eb*') is also similar.

The specific operations of the state estimation unit 350 will be described. For example, the state estimation unit 350, as shown in the following equation (6), derives "an induced voltage E*' postulated on a loss of synchronism occurring in the brushless DC motor 20", by multiplying the induced voltage E' estimated by the state estimation unit 310 by the relative speed shown in FIG. 4.

$$E^{*\prime} = r(t) \cdot E' \quad (6)$$

Note that the method of deriving the induced voltage E*' is not limited to the above method. For example, the state equation shown by the following equation (7) may be used instead of the state equation shown by the equation (2).

$$\frac{d}{dt}E^* = J^* \cdot E^* \quad (7)$$

$$\text{Here, } J^* = \begin{bmatrix} \frac{d}{dt}r(t) & -w \cdot r(t) \\ w \cdot r(t) & \frac{d}{dt}r(t) \end{bmatrix}.$$

That is, anomalous state estimation (estimation of the induced voltage E*' by the state estimation unit 350) can be performed, by using J* instead of J in equation (3), for example. Note that dr(t)/dt is the differentiation value of relative speed r(t) shown in FIG. 4, and is thus 0 before time t1 and after time t2, and will be 1/(t1−t2) between time t1 and time t2 (during deceleration).

Returning to FIG. 3, the likelihood determination unit 360 compares the induced voltage estimated by the state estimation unit 310 with the induced voltage estimated by the state estimation unit 350, and determines which is valid.

Specifically, a likelihood determination unit 360 derives an observation error err by calculating the following equation (8) based on the induced voltage estimated by the state estimation unit 310.

$$err = \left| V - RI - L\frac{d}{dt}I - E' \right| \quad (8)$$

Furthermore, the likelihood determination unit 360 derives an observation error err* by calculating the following equation (9) based on the induced voltage estimated by the state estimation unit 350.

$$err^* = \left| V - RI - L\frac{d}{dt}I - E^{*\prime} \right| \quad (9)$$

The likelihood determination unit 360, in the case where the observation error err is greater than the observation error err*, determines that the induced voltage estimated by the state estimation unit 350 is valid, given that the induced voltage estimated by the state estimation unit 350 has a higher likelihood than the induced voltage estimated by the state estimation unit 310.

On the other hand, the likelihood determination unit 360, in the case where the observation error err is less than the observation error err*, determines that the induced voltage estimated by the state estimation unit 310 is valid, given that the induced voltage estimated by the state estimation unit 310 has a higher likelihood than the induced voltage estimated by the state estimation unit 350.

Here, the "likelihood" takes a larger value as the value of the "observation error" decreases, and takes a smaller value as the value of the "observation error" increases, and is, for example, the reciprocal of the observation error.

Note that since the observation error includes the effects of noise and the like, a value obtained by calculating the moving average of the observation error in the time direction may be set anew as the observation error (with regard to both the state estimation unit 310 and the state estimation unit 350).

The likelihood determination unit 360, in the case where it is determined that the induced voltage estimated by the state estimation unit 350 is valid, then judges that the occurrence of loss of synchronism was detected, and outputs the loss-of-synchronism detection notification to the controller 260.

Figure 8:
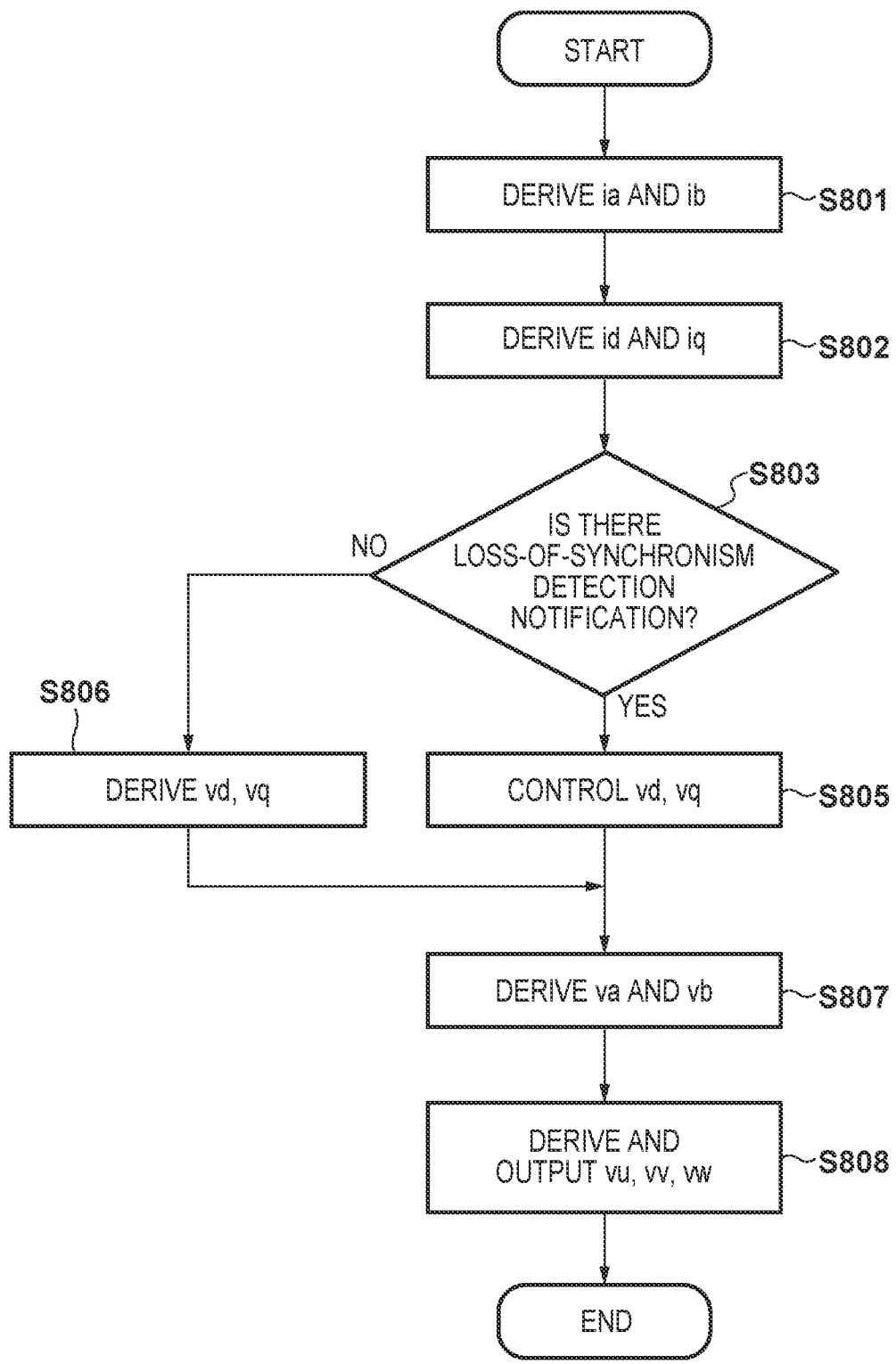
FIG. 8 is a flowchart of processing by the motor control unit 200 (excluding the estimation computation unit 240).

The processing that is performed by the motor control unit 200 (excluding the estimation computation unit 240) in order to derive the U-phase current operation amount vu, the V-phase current operation amount vv and the W-phase current operation amount vw described above will be described in accordance with the flowchart of FIG. 8.

In step S801, the converter 220 derives the α-axis current value ia and the β-axis current value ib, by performing coordinate conversion processing on the U-phase current value iu, the V-phase current value iv and the W-phase current value iw input via the input port 210.

In step S802, the converter 230 derives the d-axis current value id and the q-axis current value iq, by performing coordinate rotation processing that is based on the estimated phase θ' from the estimation computation unit 240 on the α-axis current value ia and the β-axis current value ib.

In step S803, the controller 260 judges whether the loss-of-synchronism detection notification has been received from the estimation computation unit 240. If the result of this judgment indicates that the loss-of-synchronism detection notification has been received, the processing advances to step S805, and if the result of this judgment indicates that the loss-of-synchronism detection notification has not been received, the processing advances to step S806.

In step S805, the controller 260 performs current operation amount control in response to the loss of synchronism detection, so as, for instance, to gradually reduce the current d-axis current operation amount vd and q-axis current operation amount vq over time.

In step S806, the controller 260 determines the q-axis current command value from the speed command value wt that is input via the input port 205 and the estimated speed w' of the brushless DC motor 20 that is output by the estimation computation unit 240. The controller 260 then derives the d-axis current operation amount vd and the q-axis current operation amount vq, from the q-axis current command value, the d-axis current value id and the q-axis current value iq.

In step S807, the converter 270 derives the α-axis current operation amount va and the β-axis current operation amount vb, by performing coordinate rotation processing that is based on the estimated phase θ' from the estimation computation unit 240 on the d-axis current operation amount vd and the q-axis current operation amount vq.

In step S808, the converter 280 derives the U-phase current operation amount vu, the V-phase current operation amount vv and the W-phase current operation amount vw, by performing coordinate conversion processing on the α-axis current operation amount va and the β-axis current operation amount vb. The converter 280 then outputs the U-phase current operation amount vu, the V-phase current operation amount vv and the W-phase current operation amount vw to the brushless DC motor 20 via the output port 290.

Figure 9:
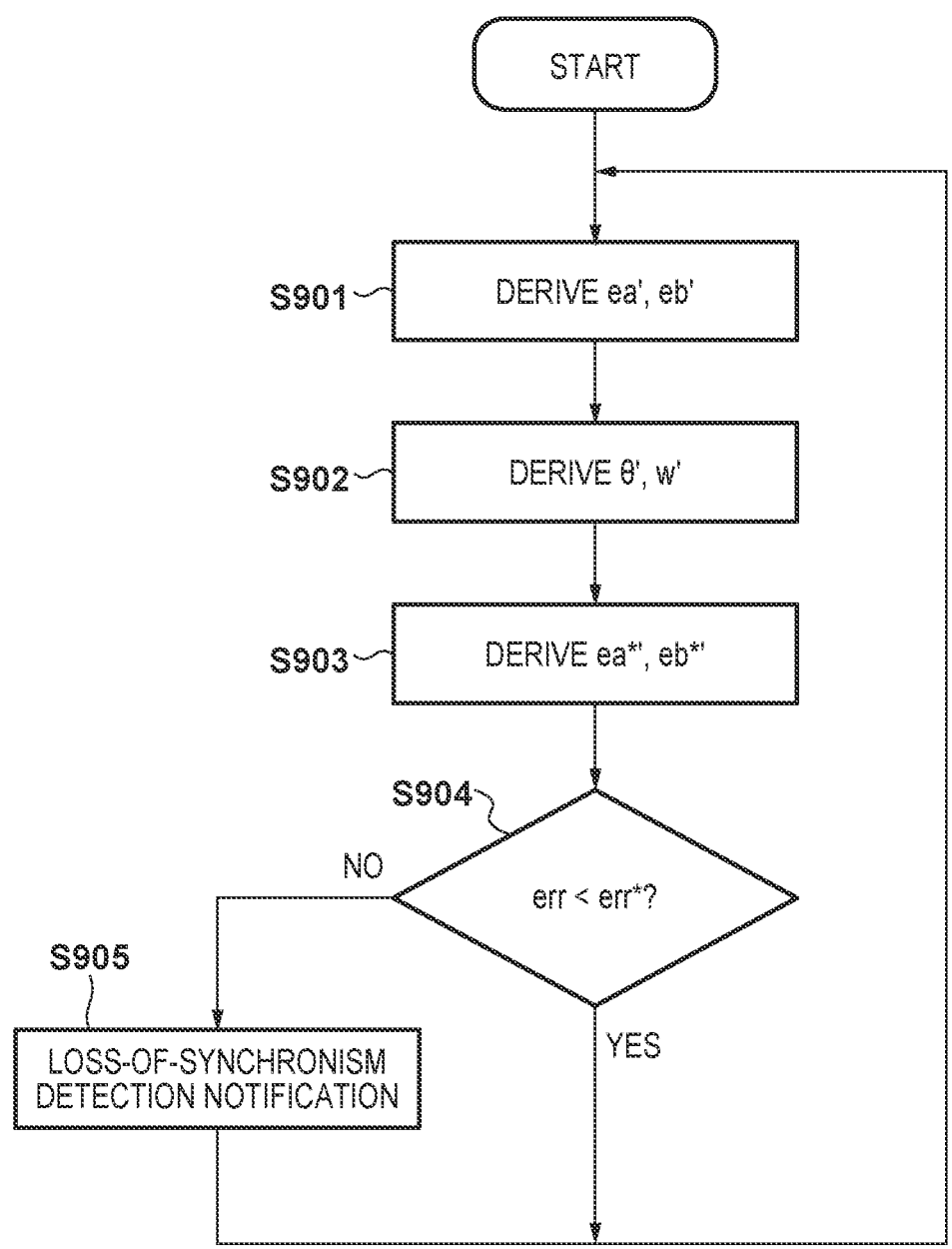
FIG. 9 is a flowchart of processing that is performed by the estimation computation unit 240.

Next, processing that is performed by the estimation computation unit 240 in order to derive the U-phase current operation amount vu, the V-phase current operation amount vv and the W-phase current operation amount vw will be described in accordance with the flowchart of FIG. 9. The processing in accordance with the flowchart of FIG. 9 is given as being performed in parallel with the processing in accordance with the flowchart of FIG. 8.

In step S901, the state estimation unit 310 estimates the induced voltages ea' and eb' that occur in the brushless DC motor 20, using the current operation amounts va and vb and the current values ia and ib.

In step S902, the phase calculation unit 320 derives the estimated phase θ' using the induced voltages ea' and eb', and outputs the derived estimation phase θ' to the downstream speed calculation unit 330 and to the converter 230 and the converter 270. The speed calculation unit 330 derives the estimated speed w', by differentiating the estimated phase θ' received from the phase calculation unit 320, and outputs the derived estimated speed w' to the controller 260.

In step S903, the state estimation unit 350 estimates the induced voltages ea*' and eb*' postulated on a loss of synchronism occurring in the brushless DC motor 20, from the current operation amounts va and vb and the current values ia and ib.

In step S904, the likelihood determination unit 360 determines whether the observation error err that is based on the induced voltage estimated by the state estimation unit 310 is less than the observation error err* that is based on the induced voltage estimated by the state estimation unit 350. If the observation error err is less than the cub observation error err*, the processing advances to step S901, and if the observation error err is greater observation error err*, the processing advances to step S905. In step S905, the likelihood determination unit 360 outputs the loss-of-synchronism detection notification to the controller 260.

In this way, in the present embodiment, two state estimation units are provided, and state estimation assuming loss of synchronism is performed in one of the state estimation units. Furthermore, loss of synchronism is determined by comparing both estimation results. Note that there may be a plurality of state estimation units 350, or estimation may be performed using deceleration models corresponding to respectively different causes for loss of synchronism. In this case, the likelihood determination unit 360 outputs the loss-of-synchronism detection notification to the controller 260, if the state estimation unit with the highest likelihood (smallest observation error) among all of the state estimation units is the state estimation unit that performed estimation using a deceleration model.

Note that the present embodiment is also applicable to anomalies other than loss of synchronism. As long as a speed variation model is definable for the event (as long as a speed variation model corresponding to the event can be provided), event occurrence can be detected using a similar configuration to the above. For example, such a configuration may be used in detection of motor lock at startup, eccentricity and the like. In the case of motor lock at startup, the speed variation model will always be 0. In the case of eccentricity, a sine wave-shaped speed variation model corresponding to the cycle of the eccentricity will be used.

Also, a plurality of events may be detected at the same time. A configuration may be adopted in which, when a plurality of anomalies (e.g., loss of synchronism and eccentricity) can arise at the same time, state estimation units corresponding to the respective anomalies are operated, and the existence of an anomaly is distinguished separately by comparing the respective likelihoods with a threshold value.

Also, although an induced voltage is estimated as a state value of the brushless DC motor 20 in the present embodiment, the information that is estimated as a state value of the brushless DC motor 20 is not limited to an induced voltage. For example, a configuration may be adopted in which the rotation speed of the brushless DC motor 20 is defined as a state value of the brushless DC motor 20, and the rotation speed is estimated more directly. In other words, the information that is estimated as a state value of the brushless DC motor 20 need only be a parameter concerning the rotation of the brushless DC motor 20.

In this way, according to the present embodiment, loss of synchronism can be detected with high accuracy and speed, in the case of driving a motor using sensorless vector control, and effects such as prevention of excessive current, for example, are obtained.

Second Embodiment

Each of the following embodiments including the present embodiment will be described with regard to differences from the first embodiment, and are considered to be similar to the first embodiment unless otherwise noted below. In the present embodiment, optimization of computational complexity and determination accuracy is attained, by including a simple loss of synchronism determination as preprocessing of the state estimation (anomalous state estimation) by a state estimation unit 650.

Figure 6:
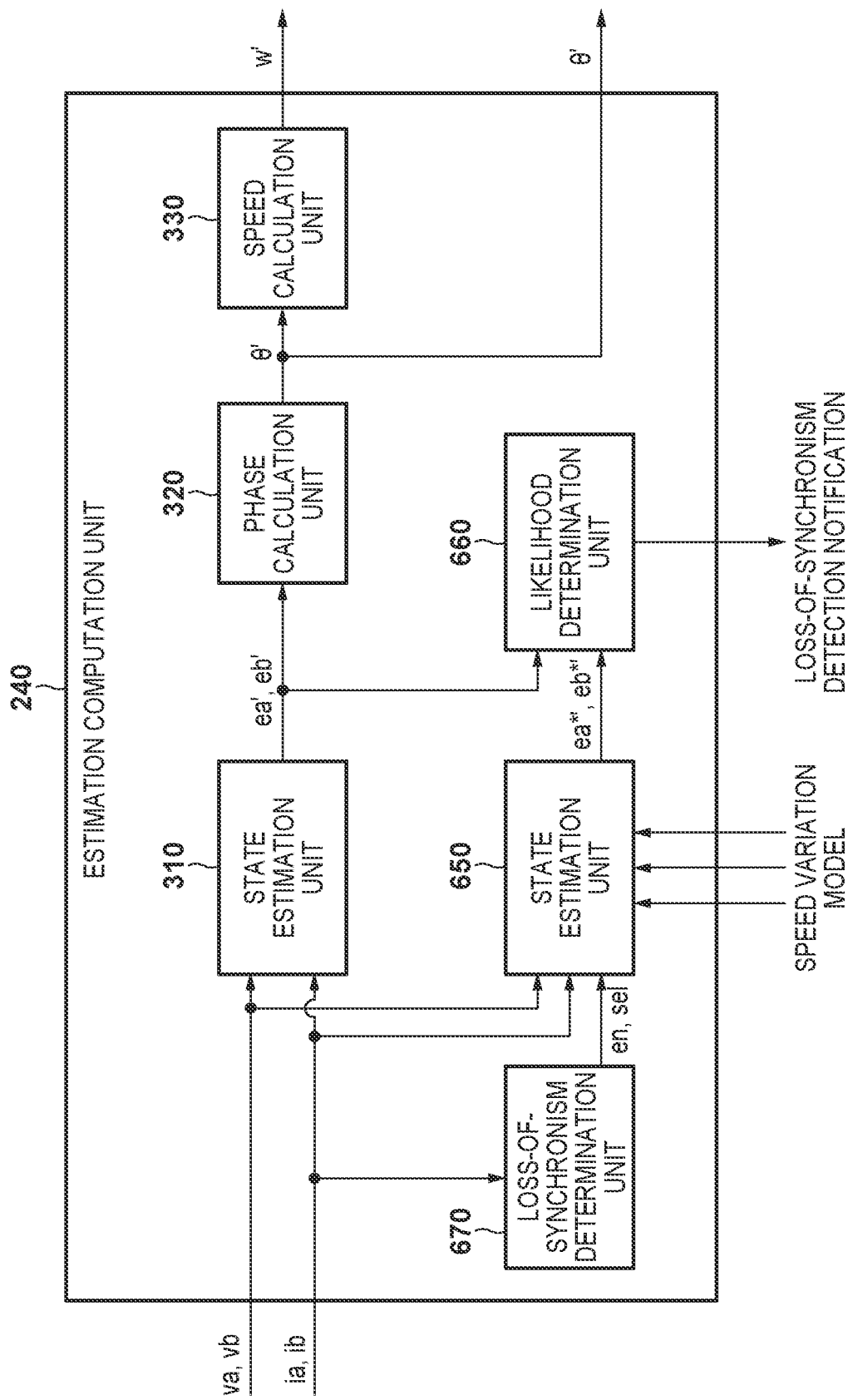
FIG. 6 is a block diagram showing an exemplary functional configuration of the estimation computation unit 240.

An exemplary functional configuration of the estimation computation unit 240 according to the present embodiment will be described using the block diagram of FIG. 6. In FIG. 6, the same reference numerals are given to functional units that are similar to functional units shown in FIG. 3, and description concerning these functional units is omitted.

A loss-of-synchronism determination unit 670 performs a simple loss of synchronism determination using the current values ia and ib. For example, the loss-of-synchronism determination unit 670 determines that loss of synchronism is a possibility in the case where $|I|^2$ that is calculated from the current values ia and ib using the following equation (10) is larger than a threshold value. On the other hand, the loss-of-synchronism determination unit 670 determines that loss of synchronism is not a possibility as long as $|I|^2$ does not become larger than the threshold value.

$$|I|^2 = (ia^2 + ib^2) \tag{10}$$

The loss-of-synchronism determination unit 670, in the case where it is determined that loss of synchronism is a possibility, notifies that fact (possible loss-of-synchronism notification) to the state estimation unit 650. The state estimation unit 650 only performs similar estimation processing to the state estimation unit 350, in the case where the possible loss-of-synchronism notification is received from the loss-of-synchronism determination unit 670. At this time, processing is performed postulating the time at which the possible loss-of-synchronism notification is received as t1 in FIG. 4.

In this way, according to the present embodiment, computational complexity can be suppressed because normally only a simple loss of synchronism determination having little computational complexity is performed. This is particularly effective in the case where the estimation computation unit 240 is implemented with software. Although a comparatively high performance processor is required to operate a plurality of state estimation units and complete all of the processing within the control cycle, this configuration can be realized even with a low cost processor by temporarily making adjustments with the priority of other processing.

Note that the loss-of-synchronism determination unit 670 may be configured to also perform model selection. For example, the loss-of-synchronism determination unit 670 may also be configured to analyze the frequency component of the current values is and ib, and switch the deceleration model that is used by the state estimation unit 650 on the basis of this analysis. Although a configuration provided with a plurality of state estimation units was referred to in the first embodiment, a plurality of loss of synchronism causes can be addressed with one state estimation unit as long as the deceleration model is selected by the loss-of-synchronism determination unit 670.

Third Embodiment

In the first embodiment, the estimated speed w' and the estimated phase θ' that serve as the output of the estimation computation unit 240 were computed on the basis of the result of estimation by the state estimation unit 310, whereas, in the present embodiment, the result of estimation by the state estimation unit 350 is also considered in deriving the estimated speed w' and the estimated phase θ'. An exemplary functional configuration of the estimation computation unit 240 according to the present embodiment will be described using the block diagram of FIG. 7. In FIG. 7, the same reference numerals are given to functional units that are similar to functional units shown in FIG. 3, and the description concerning these functional units is omitted.

The likelihood determination unit 760 computes a likelihood P of the estimation result of the induced voltages ea' and eb' estimated by the state estimation unit 310 and a likelihood P* of the estimation result of the induced voltages ea*' and eb*' estimated by the state estimation unit 350. The likelihood determination unit 760 then estimates induced voltages ea#' and eb#', by calculating the following equation (11), for example, using the induced voltages ea' and eb', the induced voltages ea*' and eb*', the likelihood P, and the likelihood P*.

$$\begin{cases} ea\#' = \dfrac{P \cdot ea' + P^* \cdot ea^{*\prime}}{P + P^*} \\ eb\#' = \dfrac{P \cdot eb' + P^* \cdot eb^{*\prime}}{P + P^*} \end{cases} \tag{11}$$

In other words, the likelihood determination unit 760 derives the weighted sum of the induced voltage ea' and the induced voltage ea*' (the weights of the induced voltages respectively being the likelihood P and likelihood P*) as the induced voltage ea#'. Similarly, the likelihood determination unit 760 derives the weighted sum of the induced voltage eb' and the induced voltage eb*' (the weights of the induced voltages respectively being the likelihood P and likelihood P*) as the induced voltage eb#'.

Here, the likelihood P, as shown in the following equation (12), can be derived as the reciprocal of the observation error err derived in accordance with the above equation (8).

$$P = \frac{1}{err} \tag{12}$$

Similarly, the likelihood P*, as shown in the following equation (13), can be derived as the reciprocal of the observation error err* derived in accordance with the above equation (9).

$$P^* = \frac{1}{err^*} \tag{13}$$

Note that the likelihoods P and P* are not limited to this calculation method, and may be derived in accordance with the following equations (14) and (15), for example.

$$P = e^{-err} \tag{14}$$

$$P^* = e^{-err^*} \tag{15}$$

Here, e is a natural logarithm. The phase calculation unit 720 then derives the estimated phase θ', by performing computational processing in accordance with the above equation (4), using the induced voltages ea#' and eb#' instead of the induced voltages ea' and eb'. The speed calculation unit 330 derives the estimated speed w', by differentiating the estimated phase θ' derived by the phase calculation unit 720, similarly to the first embodiment.

Note that the embodiments and modifications described above may be combined as appropriate either partially or wholly. Also, the embodiments and modifications described above may be used in a selective manner either partially or wholly.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-227046, filed Nov. 27, 2017, which is hereby incorporated by reference herein in its entirety.

What is claimed is:

1. A motor control apparatus comprising:
a first estimation unit configured to estimate a parameter concerning rotation of a motor;
a second estimation unit configured to estimate a parameter concerning rotation of the motor, based on a model representing a prescribed change in a rotation speed of the motor; and
a determination unit configured to determine that an anomaly has occurred in the rotation of the motor if an observation error of the parameter estimated by the first estimation unit is greater than an observation error of the parameter estimated by the second estimation unit;
wherein the determination unit (i) calculates, as the observation error of the parameter estimated by the first estimation unit, difference between a voltage based on a circuit equation of a motor model and an induced voltage being the parameter estimated by the first estimation unit, and (ii) calculates, as the observation error of the parameter estimated by the second estimation unit, difference between the voltage based on the circuit equation of the motor model and an induced voltage being the parameter estimated by the second estimation unit.

2. The motor control apparatus according to claim 1, wherein the second estimation unit estimates the parameter concerning the rotation of the motor, based on a model representing a change of the rotation speed corresponding to loss of synchronism of the motor.

3. The motor control apparatus according to claim 1, wherein the model is a relative speed to a command speed of the rotation speed of the motor, and the second estimation unit performs estimation of the parameter concerning the rotation of the motor, based on the parameter estimated by the first estimation unit and the relative speed.

4. The motor control apparatus according to claim 1, further comprising:
a second determination unit configured to determine whether an anomaly has occurred in the rotation of the motor with a simpler determination than the determination by the determination unit,
wherein the second estimation unit, in a case where it is determined by the second determination unit that an anomaly has occurred in the rotation of the motor, estimates the parameter concerning the rotation of the motor, based on the model.

5. The motor control apparatus according to claim 1, further comprising:
a second determination unit configured to determine whether an anomaly has occurred in the rotation of the motor, with a simpler determination than the determination of the anomaly by the determination unit,
wherein the second estimation unit estimates the parameter concerning the rotation of the motor, based on a model that depends on a result of the determination by the second determination unit.

6. The motor control apparatus according to claim 1, further comprising:
a calculation unit configured to calculate a phase and a speed concerning the rotation of the motor, based on the parameter estimated by the first estimation unit.

7. The motor control apparatus according to claim 1, further comprising:
a calculation unit configured to calculate a phase and a speed concerning the rotation of the motor, based on a sum obtained by weighting the parameter estimated by the first estimation unit and the parameter estimated by the second estimation unit with likelihoods respectively corresponding to the parameters.

8. The motor control apparatus according to claim 1, wherein the first estimation unit and the second estimation unit estimate an induced voltage that occurs in the motor, as the parameter concerning the rotation of the motor.

9. The motor control apparatus according to claim 1, wherein the motor is a motor for driving a photoconductive drum and a transfer belt in an image forming apparatus.

10. An image forming apparatus comprising:
a motor; and a motor control apparatus including: a first estimation unit configured to estimate a parameter concerning rotation of the motor;

a second estimation unit configured to estimate a parameter concerning rotation of the motor, based on a model representing a prescribed change in a rotation speed of the motor; and a determination unit configured to determine that an anomaly has occurred in the rotation of the motor if an observation error of the parameter estimated by the first estimation is greater than with an observation error of the parameter estimated by the second estimation unit;

wherein the determination unit (i) calculates, as the observation error of the parameter estimated by the first estimation unit, difference between a voltage based on a circuit equation of a motor model and an induced voltage being the parameter estimated by the first estimation unit, and (ii) calculates, as the observation error of the parameter estimated by the second estimation unit, difference between the voltage based on the circuit equation of the motor model and an induced voltage being the parameter estimated by the second estimation unit.

11. A control method of a motor control apparatus, comprising:

performing a first estimation for estimating a parameter concerning rotation of a motor;

performing a second estimation for estimating a parameter concerning rotation of the motor, based on a model representing a prescribed change in a rotation speed of the motor; and determining that an anomaly has occurred in the rotation of the motor if an observation error of the parameter estimated in the first estimation is greater than with an observation error of the parameter estimated in the second estimation;

wherein in the determining (i) difference between a voltage based on a circuit equation of a motor model and an induced voltage being the parameter estimated in the first estimation is calculated as the observation error of the parameter estimated in the first estimation, and (ii) difference between the voltage based on the circuit equation of the motor model and an induced voltage being the parameter estimated in the second estimation is calculated as the observation error of the parameter estimated in the second estimation.

12. The control method of a motor control apparatus according to claim 11, wherein, in the second estimation, the parameter concerning the rotation of the motor is estimated, based on a model representing a change of the rotation speed corresponding to loss of synchronism of the motor.

13. The control method of a motor control apparatus according to claim 11, wherein the model is a relative speed to a command speed of the rotation speed of the motor, and in the second estimation, estimation of the parameter concerning the rotation of the motor is performed based on the parameter estimated in the first estimation and the relative speed.

14. The control method of a motor control apparatus according to claim 11, further comprising:

performing a second determination for determining whether an anomaly has occurred in the rotation of the motor with a simpler determination than the determination, wherein, in the second estimation, in a case where it is determined in the second determination that an anomaly has occurred in the rotation of the motor, the parameter concerning the rotation of the motor is estimated, based on the model.

15. The control method of a motor control apparatus according to claim 11, further comprising:

performing a second determination for determining whether an anomaly has occurred in the rotation of the motor, with a simpler determination than the determination of the anomaly in the determination, wherein, in the second estimation, the parameter concerning the rotation of the motor is estimated, based on a model that depends on a result of the determination in the second determination.

16. The control method of a motor control apparatus according to claim 11, further comprising:

performing calculation for calculating a phase and a speed concerning the rotation of the motor, based on the parameter estimated in the first estimation.

17. The control method of a motor control apparatus according to claim 11, further comprising:

performing calculation for calculating a phase and a speed concerning the rotation of the motor, based on a sum obtained by weighting the parameter estimated in the first estimation and the parameter estimated in the second estimation with likelihoods respectively corresponding to the parameters.

18. The control method of a motor control apparatus according to claim 11, wherein, in the first estimation and the second estimation, an induced voltage that occurs in the motor is estimated, as the parameter concerning the rotation of the motor.

19. The control method of a motor control apparatus according to claim 11, wherein a photoconductive drum and a transfer belt in an image forming apparatus are driven by the motor.

20. The control method of a motor control apparatus according to claim 19, wherein image forming s performed by the image forming apparatus.

* * * * *